Jan. 30, 1968  R. M. WEBSTER  3,366,210
WET CLUTCH LUBRICATING SYSTEM
Filed Aug. 26, 1965  2 Sheets-Sheet 1

INVENTOR.
ROBERT M. WEBSTER
BY
Brumbaugh, Free, Graves & Donohue
his ATTORNEYS

Jan. 30, 1968   R. M. WEBSTER   3,366,210
WET CLUTCH LUBRICATING SYSTEM
Filed Aug. 26, 1965   2 Sheets-Sheet 2
FIG. 2
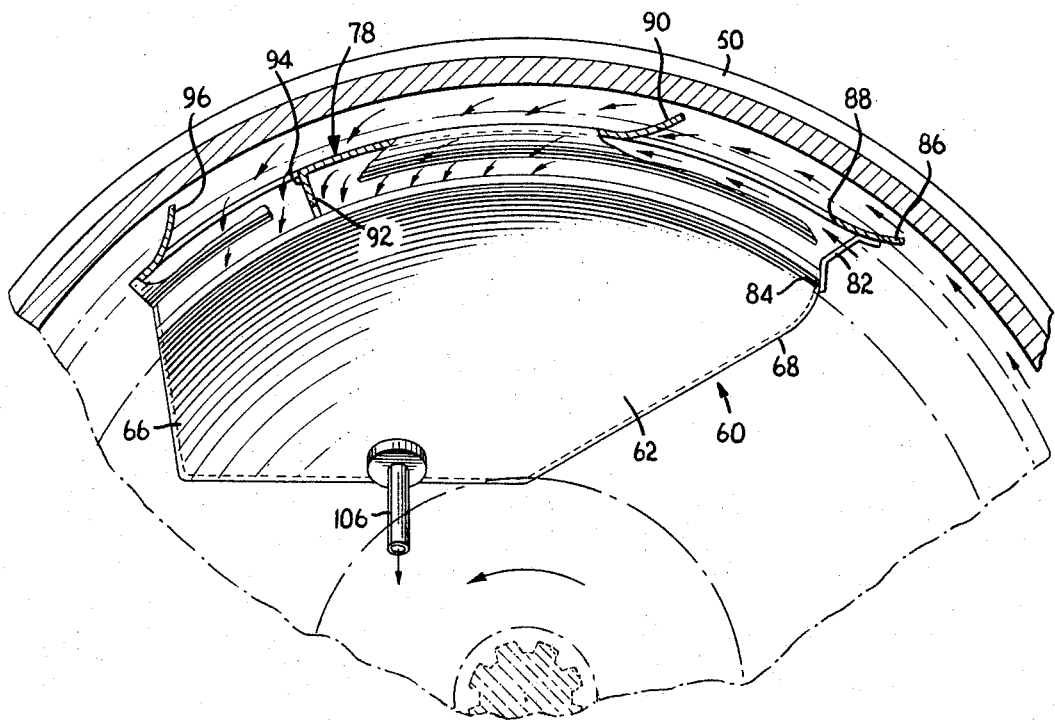
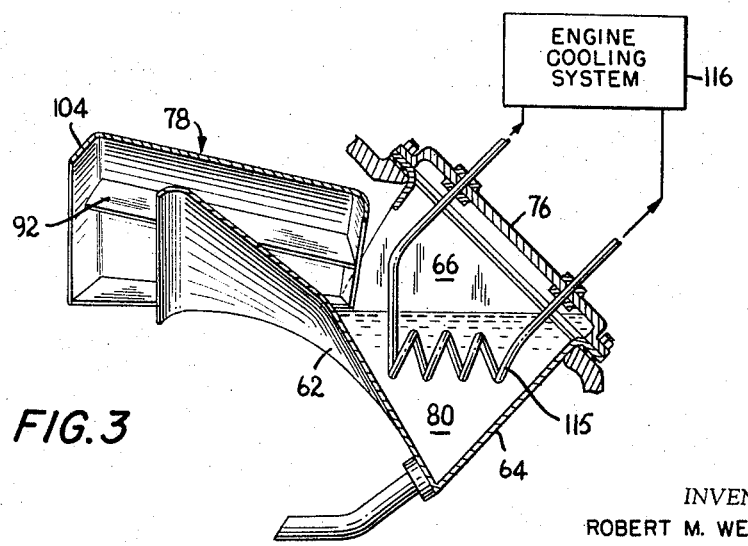
FIG. 3
INVENTOR.
ROBERT M. WEBSTER
BY
Brumbaugh, Free, Graves & Donohue
his   ATTORNEYS

United States Patent Office 3,366,210
Patented Jan. 30, 1968

3,366,210
WET CLUTCH LUBRICATING SYSTEM
Robert M. Webster, Emmaus, Pa., assignor to Mack Trucks, Inc., Montvale, N.J., a corporation of New York
Filed Aug. 26, 1965, Ser. No. 482,750
10 Claims. (Cl. 192—113)

ABSTRACT OF THE DISCLOSURE

A lubricating and cooling system for a wet clutch comprising a reservoir mounted in the housing above the axis of the shafts, the reservoir being open to the entry of and serving to accumulate lubricating and cooling fluid in the housing splashed by the rotation of the driving member, and conduit means coupled to the reservoir and opening at a point inwardly of the clutching elements for discharging the fluid near the axis thereof, whereby the fluid flows by centrifugal force outwardly across the clutching elements. The reservoir includes an upper wall member conforming generally in shape to the adjacent wall portion of the clutch housing and having deflector means thereon for catching fluid propelled by rotation of the driving member and directing it into the reservoir.

---

This invention relates to wet clutches and, more particularly, to a wet clutch having a novel and improved system for lubricating and cooling the clutch parts.

In wet clutches, the clutch usually runs in oil contained in the clutch housing. Often, the oil is distributed through the housing and to the clutch parts solely by the splashing action of the flywheel and outwardly located portions of the clutch as they pass through the oil. With this type of lubricating system, the oil may not reach inwardly-located clutch parts in sufficient quantities to provide effective lubrication and cooling of the clutch discs and other parts of the clutch.

It has previously been suggested that improved lubrication and cooling can be obtained by providing an external, pressure lubricating system including a reservoir, a pump, and piping into and out of the clutch housing. For example, the main engine oil system can be employed for this purpose. This solution, however, detracts from the efficiency of the engine lubricating system and generally requires an increased engine oil reservoir capacity, a higher capacity pump and extensive piping, thereby making this type of system relatively costly.

Another known external system includes a separate reservoir and pumping system, which, like the adaptation of the main engine oil system to provide clutch lubrication, is costly, and is susceptible to malfunction. With both of the last-mentioned arrangements, it is advisable to provide a warning system to indicate a loss of pressure in the lubricating oil supply to the clutch, such a system being another source of trouble and increased costs.

The above-described and other disadvantages of presently known lubricating systems for wet clutches are overcome, in accordance with the invention, by a novel and improved lubricating system which is located entirely within the clutch housing and requires no external reservoir, pump, piping and other auxiliary equipment associated with many presently known systems. More particularly, the system of the invention comprises a reservoir mounted in the upper portion of the clutch housing which is provided with openings and deflectors for capturing oil propelled by the splashing action of the clutch parts in oil contained in the clutch housing and directing the trapped oil into a storage portion of the reservoir. A conduit is coupled to the lower part of the reservoir storage portion and has its outlet located at a point inwardly of and near the clutch friction elements. Further, the end wall of the reservoir facing the flow of liquid propelled by rotation of the clutch part is preferably inclined inwardly and in the direction of rotation of the clutch so that the liquid impinging on it is deflected generally inwardly toward the clutch axis.

The oil captured in the reservoir flows by gravity through the conduit and is discharged into the interior of the clutch and then flows outwardly by centrifugal force along the clutching elements. In addition, the oil is delivered to the pilot bearing, the splined connection between the clutch discs and the driven shaft, and the actuating mechanism of the clutch. Preferably, various channels and openings are provided to facilitate the passage of oil through the clutch parts; thus, the friction discs are provided with a series of openings arranged generally concentrically about the axis of the shafts and aligned so as to pass by the outlet of the conduit, thereby permitting oil flowing from the reservoir to pass, longitudinally with respect to the clutch axis, through the clutch discs in the direction of the flywheel. Additionally, openings are provided in the flywheel body for permitting the oil to leave the space located radially inwardly of the clutch discs and the flywheel and return to the reservoir. Passages are formed in the clutch ring and in the flywheel flange to provide additional oil flow along the frictionally engageable surfaces of the clutch discs and rings. Because an important function of the liquid in a wet clutch is to provide cooling for the friction elements, another feature of the invention is the provision of a cooling system in the lubricating system reservoir, such as a cooling coil coupled to the engine radiator.

A lubricating system, in accordance with the invention, provides a considerably improved flow of oil through the clutch parts, as compared to wet clutches in which the oil is distributed only by the splashing action. The oil is continuously circulated throughout the clutch and returned to the clutch housing, thereby improving the cooling action, as well as ensuring effective lubrication. The lubricating system can be adapted to conventional clutches of many types with relatively little modification. In particular, the reservoir can be installed through an opening formed in the clutch housing and can be attached by bolting it about the periphery of the opening between a cover and the housing wall. Oil circulation is also enhanced by the openings and passages, which can usually be formed in the parts of most conventional, existing clutches without any significant modification of them.

For a better understanding of the invention, reference may be made to the following description of an exemplary embodiment, taken in conjunction with the figures of the accompanying drawings, in which:

FIG. 2 is a front end view of the reservoir, taken generally along the line 2—2 of FIG. 1 and in the direction of the arrows, portions of the reservoir being broken away in the view for clearer illustration; and FIG. 3 is a side view in section of the reservoir, similar to that in FIG. 1, a cooling system being provided in the reservoir to keep the oil temperature at an optimum level.

Figure 1:
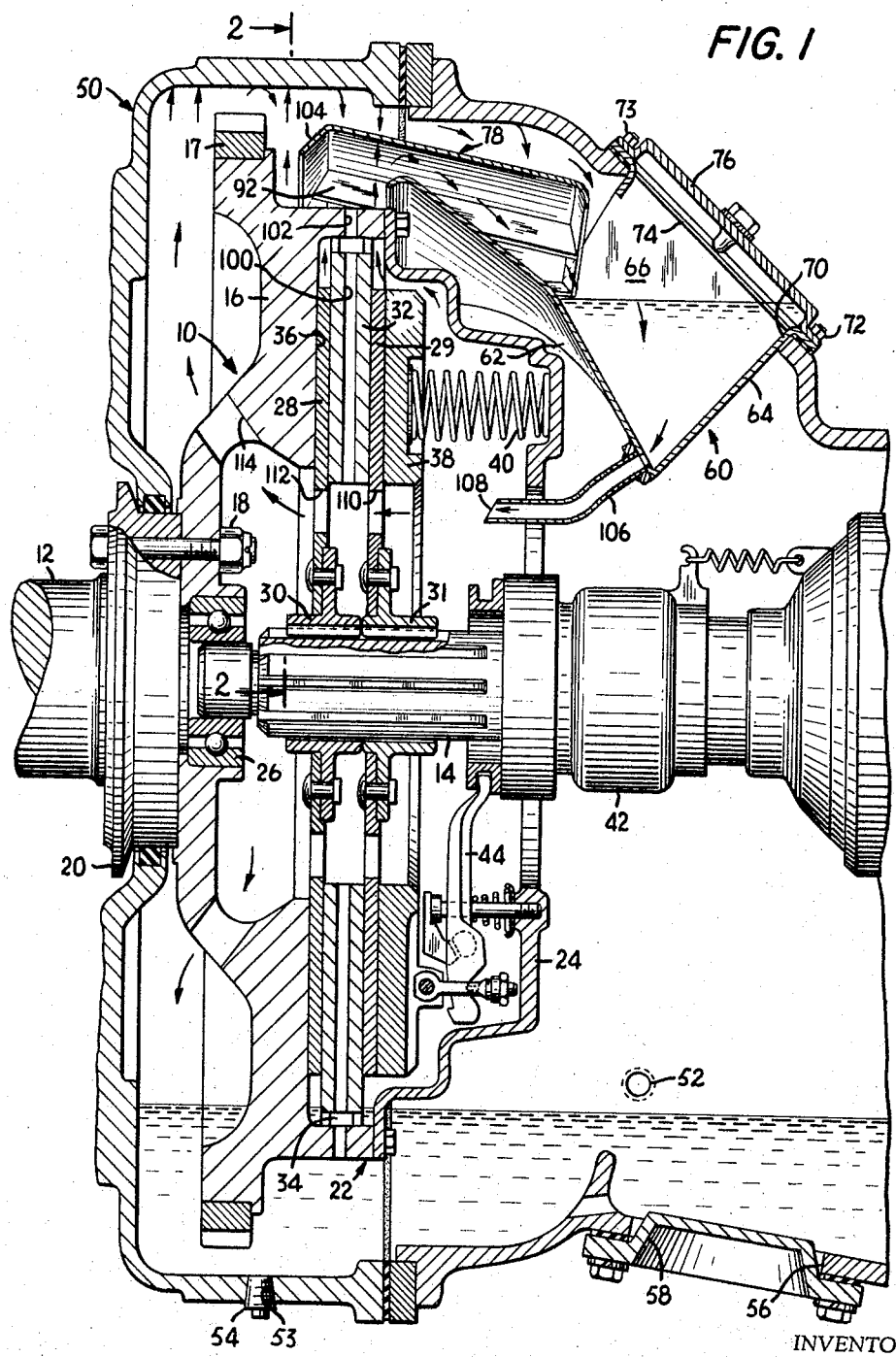
FIG. 1 is a side view in section of the clutch and the lubricating system, the section being taken generally along a vertical plane through the clutch axis.

Referring to FIG. 1, the clutch 10 is coupled to an engine crankshaft 12 and selectively transmits torque to a main drive gear shaft 14. A flywheel 16, which carries a starting gear 17, is secured by bolts 18 to a flange 20 on the crankshaft, and a rear clutch cover 24 is fastened by bolts to a peripheral rearwardly extending flange 22 on the flywheel.

The front end of the drive gear shaft 14 is journaled in a pilot bearing 26 carried by the flywheel, and a pair of clutch discs 28 and 29, riveted to carriers 30 and 31, respectively, are splined to the front end of the shaft 14. Located between the discs 28 and 29 is a clutch ring 32, which is mounted on and for rotation with the flywheel by means of inwardly extending bosses 34 received in slots formed in the clutch ring 32. The clutch discs 28 and 29 and the ring 32 are selectively engaged between a surface 36 on the flywheel and a pressure ring 38 which is urged in the direction of the flywheel by radially spaced-apart springs 40 positioned between the pressure ring and the cover member 24. The clutch is disengaged by forward axial movement of a sleeve member 42 acting through circumferentially spaced-apart levers 44 coupled to the pressure ring 38, the sleeve member 42 being suitably coupled by a suitable mechanism to the clutch pedal of the vehicle (not shown).

The clutch is contained in a closed housing 50 which is suitably mounted on the vehicle body or frame. The housing is filled to a predetermined level, which can be checked by removing a plug 52, with a suitable lubricating and cooling fluid, usually oil. The oil can be periodically changed by draining it through a drain port 53 having a removable plug 54 and an access port 56 which is provided with a removable cap 58.

At any time that the vehicle engine is running, the outwardly located portions of the flywheel pass through the oil in the clutch housing and propel the oil throughout the housing. Generally, the greatest flow of oil propelled by the flywheel is along the inner wall of the housing, as illustrated by the arrows in FIG. 2.

The lubricating system, in accordance with the invention, includes a reservoir 60 mounted within the upper portion of the clutch housing 50. The reservoir includes a curved base member 62, which slopes rearwardly and downwardly from a point near the back of the flywheel flange 22, a back wall member 64, and end wall members 66 and 68. The back member and side wall members extend through an access opening 70 formed in the clutch housing 50 and are provided at their upper ends with flanges 72, 73 and 74 which are clamped between the housing 50 and a cover member 76 to mount the reservoir in the housing.

The reservoir also has an upper wall or top 78 which is provided with deflectors for capturing the oil propelled along the inner wall of the housing and directing it into the rearwardly located, relatively deep storage portion of the reservoir. More particularly, the top member 78 is curved and conforms generally in shape to the adjacent wall portion of the housing 50. Referring to FIG. 2, the top member 78 is joined to the side wall 68 by spaced-apart angle brackets 82, and the upper edge of the wall 68 is spaced from the top member to provide a side opening 84 for admitting oil into the reservoir. The edge 86 of the top member adjacent the opening 84 is inclined upwardly to capture oil and deflect it through the opening into the reservoir.

Adjacent the edge 86 of the top member 78 is an opening 88 having, at the downstream edge, an upwardly directed deflector 90 to capture oil passing between the end 86 and the inner wall of the housing 50 and deflect it into the reservoir. Located some distance downstream, with respect to the direction of travel of the oil propelled through the housing, is a downturned deflector 92 which deflects oil entering through the openings 84 and 88 downwardly into the reservoir storage portion. An opening 94 is provided further downstream from the deflector 92, and an additional upturned deflector 96 is located at the downstream end of the opening 94, providing a further entry point for oil into the reservoir.

Referring to FIGS. 1 and 3, the front end of the top member 78 of the reservoir extends somewhat beyond the front edge of the base member 62, the extended portion lying generally radially outwardly of the friction elements of the clutch. The clutch ring 32 and the flywheel flange 22 have a plurality of spaced-apart radially disposed, aligned passages 100 and 102, respectively, which permit oil entering the central region of the clutch inwardly of the clutch elements to pass radially outwardly by centrifugal force. The extended front portion of the top member 78 is positioned to capture oil leaving the passage 102 and deflect it into the reservoir. Moreover, the extended front portion also captures oil splashed by the flywheel. The front end 104 of the top member 78 is inclined inwardly and forwardly and deflects the propelled oil against the major surface of the top member, from which it flows into the storage portion of the reservoir.

The oil captured in the reservoir and accumulated in the storage portion is conducted into the central region of the clutch by a conduit 106 which is secured to the lower end of the base 62 and leads forwardly to its outlet 108 just behind the clutch pressure plate 38 and inwardly of the inner edges of the clutch discs and clutch ring. To permit the oil coming from the reservoir conduit 106 to pass longitudinally through the clutch discs, a plurality of circumferentially spaced-apart openings 110 and 112 are provided in them. In addition, openings 114 are provided in the flywheel 16 to permit oil to flow from the region within the clutch discs 28 and 29 and the flywheel body outwardly into the clutch housing in order to prevent the accumulation of oil in the interior of the clutch and provide continuous flow-through.

The openings and passages provided in the various clutch parts provide improved distribution of the oil and, therefore, highly effective lubrication and cooling of the clutch parts. The oil contained in the clutch housing is circulated at a high turnover rate from the housing into the storage reservoir, and thence through the conduit and outwardly across the clutch parts back into the housing or to the reservoir. If desired, a suitable cooling system can be provided in the reservoir, or alternatively, in the bath of oil contained in the housing. For example, referring to FIG. 3, a cooling coil 115 can be immersed in the storage portion of the reservoir and cooling fluid from the engine cooling system 116 circulated through the coil to maintain the oil temperature at a level providing optimum cooling for the clutch.

It will be understood that the above-described embodiment of the invention is merely exemplary and that many modifications and variations can be made by those skilled in the art without departing from the spirit and scope of the invention. All such modifications and variations are intended to be included within the scope of the invention as defined in the appended claims.

I claim:

1. In a wet clutch having a housing, a driving member, a driven member and clutching elements for selectively transmitting torque from the driving shaft to the driven shaft, the combination therewith of a lubricating system comprising a reservoir mounted in the housing above the axis of the shafts, the reservoir being open to the entry of and serving to accumulate lubricating and cooling fluid in the housing splashed by the rotation of the driving member and including an upper wall member conforming generally in shape to the adjacent wall portion of the clutch housing and having deflector means thereon for catching fluid propelled by rotation of the driving member and directing it into the reservoir, and conduit means coupled to the reservoir and opening at a point inwardly of the clutching elements for discharging the fluid near the axis thereof, whereby the fluid flows by centrifugal force outwardly across the clutching elements.

2. In a wet clutch having a housing, a driving member, a driven member and clutching elements for selectively transmitting torque from the driving shaft to the driven shaft, the combination therewith of a lubricating system comprising a reservoir mounted in the housing above the axis of the shafts, the reservoir being open to the entry of and serving to accumulate lubricating and cooling fluid in the housing splashed by the rotation of the driving member and including a side wall member facing the fluid propelled by the driving member and inclined inwardly and in the direction of rotation of the driving member so as to deflect the liquid impinging thereon toward the axis of the clutch, and conduit means coupled to the reservoir and opening at a point inwardly of the clutching elements for discharging the fluid near the axis thereof, whereby the fluid flows by centrifugal force outwardly across the clutching elements.

3. In a wet clutch having a housing, a driving member, a driven member and clutching elements for selectively transmitting torque from the driving shaft to the driven shaft, the combination therewith of a lubricating system comprising a reservoir mounted in the housing above the axis of the shafts, the reservoir being open to the entry of and serving to accumulate lubricating and cooling fluid in the housing splashed by the rotation of the driving member, the reservoir further including a base member curving over the upper portion of the driving member and inclined downwardly and rearwardly, side wall members joined to the base member and defining a relatively deep storage portion at the rearward end of the reservoir, an upper wall member conforming in shape to the adjacent housing wall and extending between and joined to the end members, the upper wall member having deflector means thereon for directing the fluid propelled by rotation of the driving member into the reservoir and having openings adjacent the deflector means for admitting the liquid deflected by the deflectors into the reservoir, and conduit means coupled to the reservoir and opening at a point inwardly of the clutching elements for discharging the fluid near the axis thereof, whereby the fluid flows by centrifugal force outwardly across the clutching elements.

4. Apparatus according to claim 3 wherein the side wall member facing the fluid propelled by rotation of the driving member is inclined inwardly toward the axis of the clutch and in the direction of rotation of the driving member so as to deflect liquid impinging thereon toward the clutch axis.

5. Apparatus according to claim 3 wherein the reservoir upper wall member extends forwardly beyond the front edge of the reservoir base member and wherein the front portion of the upper wall member is disposed radially outwardly of the clutching elements and is inclined rearwardly and downwardly to deflect fluid impinging thereon into the storage portion of the reservoir.

6. Apparatus according to claim 5 wherein the side wall member facing the propelled liquid has an opening therein for admitting the liquid into the reservoir.

7. Apparatus according to claim 6 wherein the side wall member opening is immediately adjacent the upper wall member and the end of the upper wall member is curved upwardly to capture and deflect fluid through the said opening into the reservoir.

8. Apparatus according to claim 6 wherein the upper wall member has an opening in the portion thereof adjacent the upwardly curved edge and has an upturned deflector on the downstream edge thereof, with respect to the direction of travel of the propelled liquid.

9. Apparatus according to claim 6 wherein there is a downturned deflector on the top member in the portion thereof near the downstream side wall of the reservoir, with respect to the direction of travel of the propelled liquid.

10. In a wet clutch having a housing, a driving shaft, a driving member coupled to the driving shaft and carrying first clutching elements, and a driven shaft carrying second clutching elements selectively engageable with the first elements for transmitting torque from the driving member to the driven member, the combination therewith of a clutch lubricating and cooling system comprising a reservoir mounted within the housing above the axis of the shafts, the reservoir being open to the entry of a lubricating and cooling fluid contained in the housing and having means thereon for capturing and accumlating liquid splashed by rotation of the driving member, conduit means coupled to the reservoir and opening at a point inwardly of the clutching elements for discharging the fluid into the clutch, whereby the fluid flows by centrifugal force outwardly to and over the clutch parts, and means in the reservoir for cooling the lubricating and cooling fluid including a cooling coil in the reservoir coupled to the engine cooling system for circulating a cooling liquid through the coil.

References Cited

UNITED STATES PATENTS

| 1,673,566 | 6/1928 | Himes | 192—113.2 X |
| 2,107,954 | 2/1938 | Morton et al. | 192—113.1 |
| 2,956,650 | 10/1960 | Wilson | 192—113.2 |
| 3,002,597 | 10/1961 | Warman et al. | 192—113.1 X |
| 3,104,746 | 9/1963 | Gadd et al. | 192—113.2 |

FOREIGN PATENTS

| 742,120 | 12/1932 | France. |
| 894,029 | 3/1944 | France. |

BENJAMIN W. WYCHE, III, *Primary Examiner.*